US012670734B2

(12) United States Patent
Xu et al.

(10) Patent No.: US 12,670,734 B2
(45) Date of Patent: Jun. 30, 2026

(54) REAL-TIME LICENSE PLATE DETECTION AND RECOGNITION METHOD AND DEVICE BASED ON COLOR AUGMENTATION

(71) Applicant: ZHEJIANG LAB, Hangzhou (CN)

(72) Inventors: Fen Xu, Hangzhou (CN); Jun Wang, Hangzhou (CN); Weiqiang Cao, Hangzhou (CN); Xiaogang Xu, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 321 days.

(21) Appl. No.: 18/221,712

(22) Filed: Jul. 13, 2023

(65) Prior Publication Data

US 2024/0046668 A1     Feb. 8, 2024

(30) Foreign Application Priority Data

Aug. 4, 2022     (CN) .......................... 202210930831.3

(51) Int. Cl.
*G06V 20/62*          (2022.01)
*G06N 3/08*           (2023.01)
(Continued)

(52) U.S. Cl.
CPC .............. *G06V 20/625* (2022.01); *G06T 5/50* (2013.01); *G06T 7/90* (2017.01); *G06V 10/247* (2022.01);
(Continued)

(58) Field of Classification Search
CPC .... G06V 20/625; G06V 10/247; G06V 10/26; G06V 10/774; G06V 10/82; G06V 10/25;
(Continued)

(56) References Cited

U.S. PATENT DOCUMENTS

| 2021/0027086 A1* | 1/2021 | Das | G06V 10/26 |
| 2022/0164961 A1* | 5/2022 | Lee | G06T 7/194 |

(Continued)

OTHER PUBLICATIONS

Z. Selmi, M. Ben Halima and A. M. Alimi, "Deep Learning System for Automatic License Plate Detection and Recognition," 2017 14th IAPR International Conference on Document Analysis and Recognition (ICDAR), Kyoto, Japan, 2017, pp. 1132-1138, doi: 10.1109/ICDAR.2017.187. (Year: 2017).*

(Continued)

*Primary Examiner* — Gregory A Morse
*Assistant Examiner* — Ronde Lee Miller
(74) *Attorney, Agent, or Firm* — Jiwen Chen; Joywin IP Law PLLC

(57)          ABSTRACT

The present invention discloses a real-time license plate detection and recognition method and device based on color augmentation, the method comprises: step 1: obtaining car images containing license plates as a license plate detection training set, inferring license plate detection results through the trained license plate detection model; step 2: performing view correction transformation on the detected license plates to obtain frontal view images of the license plates; step 3, using the obtained frontal view images of the license plates as a training set for license plate recognition, using a license plate recognition model based on deep neural network for license plate recognition to obtain license plate recognition results; step 4: displaying the license plate detection results and the license plate recognition results on the original test images or outputting them as needed, completing the detection and recognition of the license plates in the images.

7 Claims, 3 Drawing Sheets

(51) Int. Cl.

| | |
|---|---|
| *G06T 5/50* | (2006.01) |
| *G06T 7/90* | (2017.01) |
| *G06V 10/24* | (2022.01) |
| *G06V 10/25* | (2022.01) |
| *G06V 10/26* | (2022.01) |
| *G06V 10/56* | (2022.01) |
| *G06V 10/774* | (2022.01) |
| *G06V 10/82* | (2022.01) |

(52) U.S. Cl.
CPC ............ *G06V 10/26* (2022.01); *G06V 10/774* (2022.01); *G06V 10/82* (2022.01); *G06T 2207/10024* (2013.01); *G06T 2207/20081* (2013.01); *G06T 2207/20084* (2013.01)

(58) Field of Classification Search
CPC .......... G06V 10/56; G06V 10/24; G06T 5/50; G06T 7/90; G06T 2207/10024; G06T 2207/20081; G06T 2207/20084; G06N 3/08
See application file for complete search history.

(56) References Cited

U.S. PATENT DOCUMENTS

| | | | |
|---|---|---|---|
| 2023/0245293 A1* | 8/2023 | Tang ...................... | G06V 10/26 382/103 |
| 2023/0289928 A1* | 9/2023 | Rodrigues ................ | G06T 5/77 |

OTHER PUBLICATIONS

Feng Wang, Lichun Man, Bangping Wang, Yijun Xiao, Wei Pan, Xiaochun Lu, Fuzzy-based algorithm for color recognition of license plates, Pattern Recognition Letters, vol. 29, Issue 7, 2008, pp. 1007-1020, ISSN 0167-8655, https://doi.org/10.1016/j.patrec.2008.01.026. (Year: 2008).*

Ying, Qian, and Jun Gan Sheng. "Research of license plate recognition based on HSV Space." 2016 3rd International Conference on Materials Engineering, Manufacturing Technology and Control. Atlantis Press, 2016. (Year: 2016).*

Xuewen Yang, Xin Wang "Recognizing License Plates in Real-Time" arXiv:1906.04376, https://arxiv.org/pdf/1906.04376v5 (Year: 2022).*

S. M. Silva and C. R. Jung, "License plate detection and recognition in unconstrained scenarios," in European Conference on Computer Vision, pp. 593-609, 2018 (Year: 2018).*

* cited by examiner

Step 1: obtaining car images containing license plates as a license plate detection training set, transforming images containing blue license plates in the detection training set into images containing yellow license plates and green license plates through color augmentation, and then using a license plate detection model based on deep convolutional neural network for training to obtain a trained license plate detection model, inferring license plate detection results through the trained license plate detection model Step 2: performing view correction transformation on the detected license plates to obtain frontal view images of the license plates Step 3, using the obtained frontal view images of the license plates as a training set for license plate recognition, using a license plate recognition model based on deep neural network for license plate recognition to obtain license plate recognition results Step 4: displaying the license plate detection results and the license plate recognition results on the original test images or outputting them as needed, completing the detection and recognition of the license plates in the images

Figure 1

License plate detection results

Figure 2

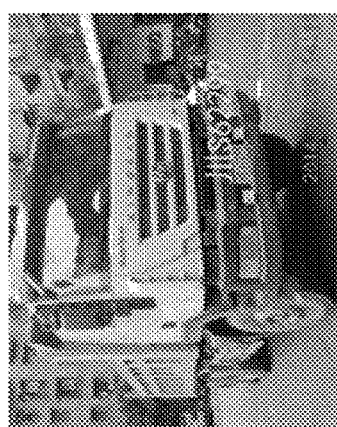
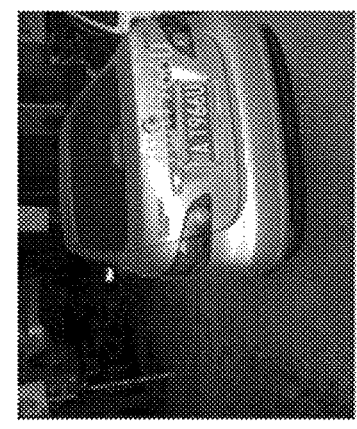
Display
Performing view correction transformation on the license plate
License plate recognition
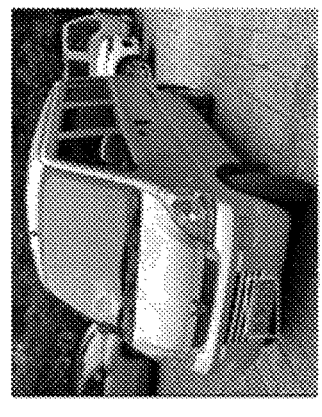
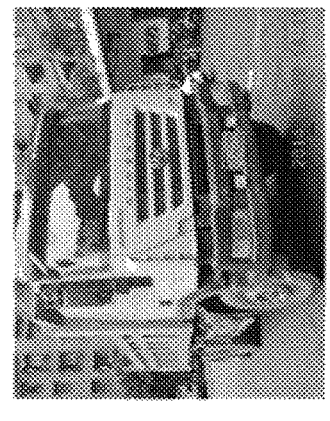
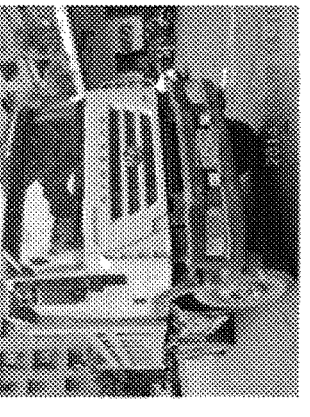
License plate detection
Green license plate
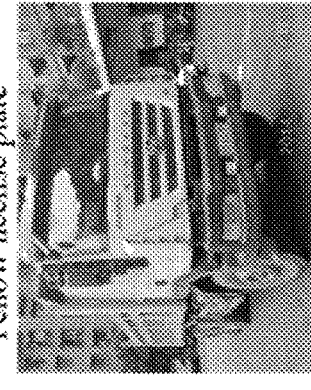
Yellow license plate
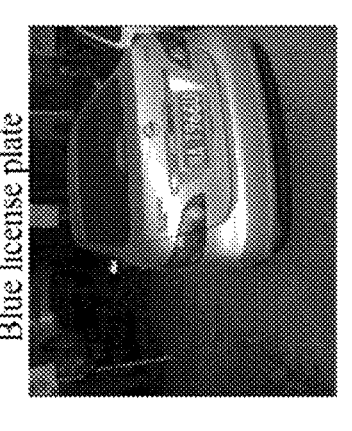
Blue license plate
Inputing images
Figure 3

REAL-TIME LICENSE PLATE DETECTION AND RECOGNITION METHOD AND DEVICE BASED ON COLOR AUGMENTATION

This application claims priority of Chinese Application No. 202210930831.3, filed Aug. 4, 2022, which is hereby incorporated by reference.

FIELD OF TECHNOLOGY

The present invention relates to the field of computer vision, in particular to a real-time license plate detection and recognition method and device based on color augmentation.

BACKGROUND TECHNOLOGY

As an important urban transportation tool, vehicles have brought great convenience to people's lives, the number of vehicles in China is increasing at a rate of over 10% annually, how to effectively manage motor vehicles is one of the key and difficult issues in urban management, and corresponding effective means are urgently needed to solve them. The use of deep learning technology to solve license plate detection and recognition is currently a research hotspot in computer vision technology in urban management. The current image detection and recognition algorithms based on deep learning require sufficient training samples. However, in reality, actual data is not easy to obtain, the collection process is slow, samples are often limited, and data processing and annotation are required before using it for training. In order to achieve higher annotation accuracy, manual inspection is also required. How to train high-quality detection and recognition algorithms using limited samples is a challenge in image detection and recognition.

Based on limited samples, data augmentation techniques are used to process patterns in deep learning, which can appropriately process limited sample data and generate more supplementary training samples to enhance the model's ability to summarize the features of the training samples. However, in practice, sample collection and acquisition are difficult and costly, resulting in significant limitations of available samples. In order to compensate for the limitations of the samples, new training samples can be artificially derived from known images through appropriate set transformations, pixel adjustments (such as scaling, pixel processing, etc.), and such techniques or measures are data augmentation. However, the commonly used enhancement methods are not effective in detecting and recognizing license plates of different colors. Obtaining blue license plates is relatively easy, but the model trained with blue license plate data using conventional data augmentation methods cannot detect and recognize yellow license plates and green license plates at all.

RGB is the most commonly used color space in daily life, represented by three channels: red, green, and blue. The different combinations of these three colors can form almost all other colors. HSV is based on RGB and is created as a more convenient and friendly method. The way of HSV expresses color images consists of three parts: Hue, Saturation, and Value. The HSV color space model is an inverted cone model, where the angle represents the Hue H, the Saturation S represents the distance from the point to the center vertical line, and the brightness value V is represented by the center vertical line. HSV is an intuitive color model for users.

SUMMARY OF THE INVENTION

In order to solve the aforementioned technical problems in the existing technology, the present invention proposes a real-time license plate detection and recognition method based on color augmentation, the specific technical solution is as follows:

A real-time license plate detection and recognition method based on color augmentation, comprising the following steps:

step 1: obtaining car images containing license plates as a license plate detection training set, transforming images containing blue license plates in the detection training set into images containing yellow license plates and green license plates through color augmentation, and then using a license plate detection model based on deep convolutional neural network for training to obtain a trained license plate detection model, inferring license plate detection results through the trained license plate detection model;

step 2: performing view correction transformation on the detected license plates to obtain frontal view images of the license plates;

step 3, using the obtained frontal view images of the license plates as a training set for license plate recognition, using a license plate recognition model based on deep neural network for license plate recognition to obtain license plate recognition results;

step 4: displaying the license plate detection results and the license plate recognition results on the original test images or outputting them as needed, completing the detection and recognition of the license plates in the images.

Furthermore, the first step comprises the following sub steps:

step S101, collecting license plate detection samples and creating the detection training dataset;

step S102, processing color augmentation on the detection training dataset;

step S103, training the license plate detection model by using the color augmented dataset;

step S104, testing the license plate detection model and obtaining the license plate detection results.

Furthermore, the color augmentation in step S102 comprises the following process:

(2.1) reading the RGB color space of the images M of the blue license plates in the detection training dataset;

(2.2) converting RGB color space to HSV color space;

(2.3) randomly generating a number n within the range of [74, 98] or [23, 89];

(2.4) subtracting n from each number in the H space and then modulo 180 to obtain H1;

(2.5) replacing H in images M with H1 to obtain converted images M1;

when the random number n in process (2.3) is within the range of [74, 98], the images M of the blue license plates will be converted into images of the yellow license plates; when the random number n in process (2.3) is within the range of [23, 89], the images M of the blue license plates will be converted to images of the green license plates.

Furthermore, the step 2 is specifically as follows: obtaining a position of the horizontal frame and four corner points of the license plate through the license plate detection model, cutting the license plate from the original image according to the position of the horizontal frame, and then using Affine Transformation to transform the view according to the position of the four corner points of the license plate, and outputting the frontal view images of the license plates; the license plate detection model adopts a deep convolutional neural network YOLOv5s architecture.

Furthermore, the Affine Transformation refers to a process of performing a linear transformation in vector space, i.e. multiplying a matrix, and a translation, i.e. adding a vector, and then transforming to another vector space.

Furthermore, the step 3 comprises the following sub steps:

Step S301, collecting license plate recognition samples and creating the recognition training dataset;

Step S302, processing color augmentation on the recognition training dataset;

Step S303, training the license plate recognition model by using the color augmented dataset;

Step S304, testing the license plate recognition model and obtaining the license plate recognition results.

Furthermore, the color augmentation in step S302 comprises the following process:

(3.1) reading the RGB color space of the frontal view images M2 of the blue license plates in the recognition training dataset;

(3.2) subtracting each value in the RGB color space of images M2 from 255 to obtain images M3; at this time, the frontal view images M2 of the blue license plates is converted into the frontal view images M3 of the yellow license plates;

(3.3) converting the RGB color space of images M3 to the HSV color space;

(3.4) randomly generating a number n1 within a range of [9,51];

(3.5) adding n1 to each number in the H space and then modulo 180 to obtain H2;

(3.6) replacing H in the images M3 with H2 to obtain converted images M4; at this time, the frontal view images M2 of the blue license plates is converted into the frontal view images M4 of the green license plates.

A real-time license plate detection and recognition device based on color augmentation, comprising one or more processors, for implementing the real-time license plate detection and recognition method based on color augmentation.

A computer readable storage medium on which a program is stored, the program is executed by the processor for implementing the real-time license plate detection and recognition method based on color augmentation.

According to the above technical solution, the beneficial effects of the present invention are as follows:

The present invention provides a license plate color augmentation method for license plate detection, which converts images containing blue license plates into images containing yellow license plates and green license plates, the generated data more comply with the requirements and avoid the interference of a large amount of invalid data generated by ordinary color augmentation on the training effect.

The present invention processes color augmentation in the original images, which not only maintains the objectivity of the training samples, but also increases the learning and training opportunities for license plates of other colors, and plays a positive role in the detection and recognition ability of license plate detection and recognition algorithms.

The present invention cascades the trained license plate detection model and the trained license plate recognition model, which can better adapt to complex and ever-changing workplaces, and has practical application value.

BRIEF DESCRIPTION OF THE DRAWINGS

FIG. 1 is a flowchart of a real-time license plate detection and recognition method based on color augmentation of the present invention;

FIG. 2 is a diagram of license plate view correction in the embodiment of the present invention;

FIG. 3 is a schematic diagram of the overall process of license plate detection and recognition in the embodiment of the present invention;

DETAILED DESCRIPTION OF THE EMBODIMENTS

Figure 4:
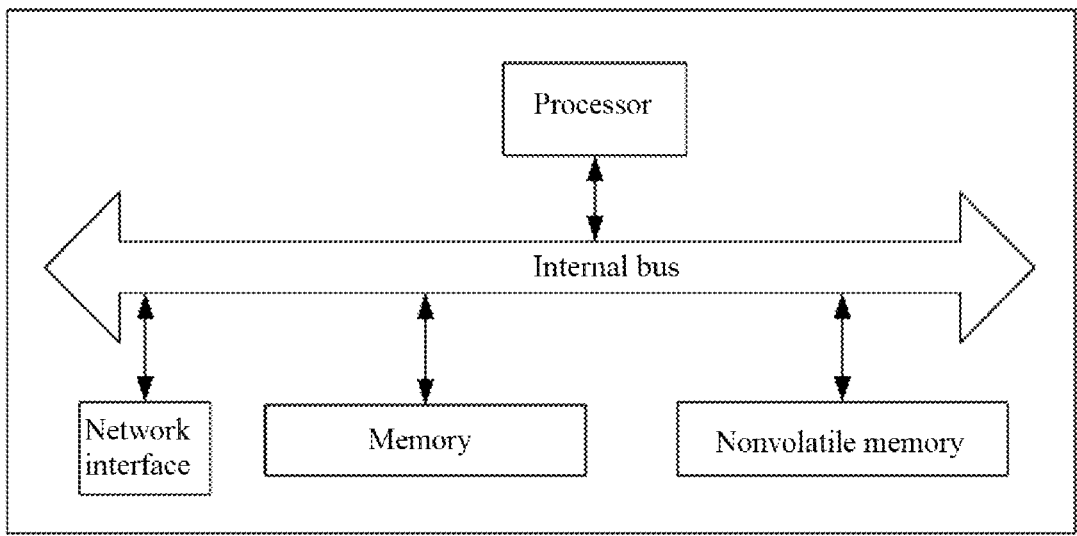
FIG. 4 is a schematic diagram of the structure of a real-time license plate detection and recognition device based on color augmentation in the embodiment of the present invention.

In order to make the purpose, technical solution, and technical effects of the present invention clearer and clearer, the following is a further detailed explanation of the present invention in conjunction with the accompanying drawings of the specification.

A real-time license plate detection and recognition method based on color augmentation of the present invention comprises the steps of: obtaining vehicle images containing license plates as a license plate detection training set, and converting images containing blue license plates into images containing yellow license plates and green license plates through color augmentation; using a deep convolutional neural network based detection model to train and obtain a trained license plate detection model; cutting the license plates of the vehicle images as a training set for license plate recognition, and transforming the blue license plates into yellow license plates and green license plates through color augmentation; using a deep neural network-based recognition model to train and obtain a trained license plate recognition model; cascading the trained license plate detection model and the license plate recognition model, performing license plate detection on the images to be detected, obtaining the detection results of license plates in images taken from different angles, and then cutting the detection results for view correction, after obtaining the frontal view images of the license plates, sending the frontal view images of the license plates to the license plate recognition model for license plate recognition output, and completing the task of license plate detection and recognition of the vehicles in the images.

Specifically, as shown in FIG. 1, comprising the following steps:

Step 1: obtaining car images containing license plates as a license plate detection training set, transforming images containing blue license plates in the detection training set into images containing yellow license plates and green license plates through color augmentation, and then using a license plate detection model based on deep convolutional neural network for training to obtain a trained license plate detection model, inferring license plate detection results through the trained license plate detection model.

Specifically, the step 1 comprising the following sub steps:

Step S101, collecting license plate detection samples and creating the detection training dataset.

Specifically, collecting vehicles with license plates in parking lots, highways, and other places as the materials of the training set, selecting images that meet the conditions, and annotating the license plates in the images to obtain the training set; the annotation information of the license plate in this example comprises the coordinates of the horizontal bounding box of the license plate and the coordinates of the four corner points of the license plate.

Step S102, processing color augmentation on the detection training dataset.

Specifically, the step S102 comprising the following process:

(2.1) reading the RGB color space of the images M of the blue license plates in the detection training dataset;

(2.2) converting RGB color space to HSV color space;

(2.3) randomly generating a number n within the range of [74, 98] or [23, 89];

(2.4) subtracting n from each number in the H space and then modulo 180 to obtain H1;

(2.5) replacing H in images M with H1 to obtain converted images M1.

When the random number n in process (2.3) is within the range of [74, 98], the images M of the blue license plates will be converted into images of the yellow license plates; when the random number n in process (2.3) is within the range of [23, 89], the images M of the blue license plates will be converted to images of the green license plates. Due to the influence of weather, lighting, and other factors, the H value of different blue license plates may vary, resulting in overlapping random numbers for yellow license plates and green license plates.

Step S103, training the license plate detection model by using the color augmented dataset.

Specifically, when the present invention reads data before training, the training data is color augmented; using the deep convolutional neural network YOLOv5s architecture for training, with preset training times; when the preset training frequency or network model convergence is reached, the training ends and the trained license plate detection model is obtained.

Step S104, testing the license plate detection model and obtaining the license plate detection results.

Inputting test images and inferring the license plate detection results through the trained license plate detection model.

Step 2: performing view correction transformation on the detected license plates to obtain frontal view images of the license plates.

Specifically, due to the fact that the images collected by surveillance cameras and handheld shooting devices containing vehicle license plates may be tilted, making them inconvenient to directly perform license plate recognition, therefore, it is necessary to perform a view correction transformation on the detected license plates to obtain the frontal view images, and to eliminate images that do not meet the conditions.

As show in FIG. 2, obtaining a position of the horizontal frame and four corner points of the license plate through the license plate detection model, cutting the license plate from the original image according to the position of the horizontal frame, and then using Affine Transformation to transform the view according to the position of the four corner points of the license plate, and outputting the frontal view image of the license plate, the size of the image is 94×24.

The Affine Transformation refers to a process of performing a linear transformation in vector space (multiplying a matrix) and a translation (adding a vector), and then transforming to another vector space. The Affine Transformation represents the mapping relationship between two drawings, and the Affine Transformation matrix is a 2×3 matrix.

Step 3, using the obtained frontal view images of the license plates as a training set for license plate recognition, using a license plate recognition model based on deep neural network for license plate recognition to obtain license plate recognition results.

Specifically, comprising the following sub steps:

Step S301, collecting license plate recognition samples and creating the recognition training dataset.

Specifically, annotating the vehicle license plate numbers in the images to obtain the recognition training set.

Step S302, processing color augmentation on the recognition training dataset.

Specifically, comprising the following sub steps:

(3.1) reading the RGB color space of the frontal view images M2 of the blue license plates in the recognition training dataset;

(3.2) subtracting each value in the RGB color space of images M2 from 255 to obtain images M3, at this time, outputting or proceeding to the next step; at this time, the frontal view images M2 of the blue license plates are converted into the frontal view images M3 of the yellow license plates;

(3.3) converting the RGB color space of the images M3 to the HSV color space;

(3.4) randomly generating a number n1 within a range of [9,51];

(3.5) adding n1 to each number in the H space and then modulo 180 to obtain H2;

(3.6) replacing H in the images M3 with H2 to obtain converted images M4; at this time, the frontal view images M2 of the blue license plates is converted into the frontal view images M4 of the green license plates.

Step S303, training the license plate recognition model by using the color augmented dataset.

Specifically, when the license plate recognition model of the present invention reads data before training, the color of the license plate data is augmented; using deep neural network LPRNet architecture for training, with preset training times; when the preset number of training sessions or network model convergence is reached, the training ends and the trained license plate recognition model is obtained.

Step S304, testing the license plate recognition model and obtaining the license plate recognition results.

Inputting the test license plate images and inferring the license plate recognition results through the trained license plate recognition mode.

Step 4: displaying the license plate detection results and the license plate recognition results on the original test images or outputting them as needed, completing the detection and recognition of the license plates in the images, the results are shown in FIG. 3, which shows that the embodiment of the present invention trains a dataset of blue license plates through color augmentation to achieve real-time detection and recognition of images of blue, yellow, and green license plate. It also demonstrates a real-time license plate detection and recognition method based on cascading (cascading the trained license plate detection model and license plate recognition model).

Corresponding to the embodiments of the real-time license plate detection and recognition method based on color augmentation mentioned above, the present invention also provides an embodiment of a real-time license plate detection and recognition device based on color augmentation.

Referring to FIG. 4, the embodiment of the present invention provides a real-time license plate detection and recognition device based on color augmentation, which comprises one or more processors for implementing the real-time license plate detection and recognition method based on color augmentation in the above embodiment.

An embodiment of the real-time license plate detection and recognition device based on color augmentation of the present invention can be applied to any device with data processing capabilities, which can be a device or equipment such as a computer. Device embodiments can be implemented through software, or through hardware or a combination of software and hardware. Taking software implementation as an example, as a logical device, it is formed by reading the corresponding computer program instructions from non-volatile memory into memory and running them through the processor of any device with data processing capabilities. From a hardware perspective, as shown in FIG. 4, it is a hardware structure diagram of any device with data processing capability that is located in the real-time license plate detection and recognition device based on color augmentation of the present invention, in addition to the processor, memory, network interface, and non-volatile memory shown in FIG. 4, in the implementation embodiment, any device with data processing capability located in the device can usually comprise other hardware based on the actual function of the device with data processing capability, and this will not be repeated.

The implementation process of the functions and effects of each unit in the above device is detailed in the corresponding steps of the above method, and will not be repeated here.

For device embodiments, since they basically correspond to the method embodiment, please refer to the partial explanation of method embodiments for relevant information. The device embodiment described above is only schematic, where the units described as separate components can be or may not be physically separated, and the components displayed as units can be or may not be physical units, that is, they can be located in one place or distributed across multiple network units. Some or all modules can be selected according to actual needs to achieve the purpose of the present invention. Ordinary technical personnel in this field can understand and implement without creative labor.

The embodiment of the present invention also provides a computer readable storage medium on which a program is stored, when the program is executed by the processor, the real-time license plate detection and recognition method based on color augmentation in the aforementioned embodiment is implemented.

The computer readable storage medium can be an internal storage unit of any device with data processing capabilities, such as a hard disk or memory, as described in any of the aforementioned embodiments. The computer readable storage medium can also be an external storage device, such as a plug-in hard disk, Smart Media Card (SMC), SD card, Flash Card, etc. provided on the device. Furthermore, the computer readable storage medium may comprise both internal storage units of any device with data processing capabilities and external storage devices. The computer readable storage medium is used to store the computer program and other programs and data required by any device with data processing capabilities, and can also be used to temporarily store data that has been or will be output.

The above is only a preferred embodiment of the present invention and does not impose any formal limitations on the present invention. Although the implementation process of the present invention has been described in detail in the previous text, for those familiar with the art, they can still modify the technical solutions recorded in the aforementioned examples or replace some of the technical features equally. Any modifications, equivalent substitutions, etc. made within the spirit and principles of the present invention shall be included within the scope of protection of the present invention.

The invention claimed is:

1. A real-time license plate detection and recognition method based on color augmentation, comprising the following steps:

obtaining car images containing license plates as a license plate detection training set, transforming images containing blue license plates in the detection training set into images containing yellow license plates and green license plates through color augmentation, and then using a license plate detection model based on deep convolutional neural network for training to obtain a trained license plate detection model, inferring license plate detection results through the trained license plate detection model;

performing view correction transformation on the detected license plates to obtain frontal view images of the license plates;

using the obtained frontal view images of the license plates as a training set for license plate recognition, using a license plate recognition model based on a deep neural network for license plate recognition to obtain license plate recognition results by the following sub steps:

collecting license plate recognition samples and creating the recognition training dataset;

processing color augmentation on the recognition training dataset;

training the license plate recognition model by using the color augmented dataset;

testing the license plate recognition model and obtaining the license plate recognition results;

displaying the license plate detection results and the license plate recognition results on the original test images or outputting the license plate detection results and the license plate recognition results, completing the detection and recognition of the license plates in the images;

wherein, the color augmentation comprises the following process:

reading the RGB color space of frontal view images M2 of the blue license plates in the recognition training dataset;

subtracting each value in the RGB color space of images M2 from 255 to obtain images M3; at this time, the frontal view images M2 of the blue license plates is converted into the frontal view images M3 of the yellow license plates;

converting the RGB color space of images M3 to the HSV color space;

randomly generating a number n1 within a range of [9,51];

adding n1 to each number in Hue (H) space and then modulo 180 to obtain H2;

replacing H in the images M3 with H2 to obtain converted images M4; at this time, the frontal view images M2 of the blue license plates is converted into the frontal view images M4 of the green license plates.

2. The real-time license plate detection and recognition method based on color augmentation according to claim 1, wherein, the first step comprises the following sub steps:

collecting license plate detection samples and creating the detection training dataset;

processing color augmentation on the detection training dataset;

training the license plate detection model by using the color augmented dataset;

testing the license plate detection model and obtaining the license plate detection results.

3. The real-time license plate detection and recognition method based on color augmentation according to claim 2, wherein, the color augmentation in step comprises the following process:

reading the RGB color space of images M of the blue license plates in the detection training dataset;

converting RGB color space to HSV color space;

randomly generating a number n within the range of [74, 98] or [23, 89];

subtracting n from each number in Hue (H) space and then modulo 180 to obtain H1;

replacing H in images M with H1 to obtain converted images M1;

when the random number n is within the range of [74, 98], the images M of the blue license plates are converted into images of the yellow license plates; when the random number n is within the range of [23, 89], the images M of the blue license plates are converted to images of the green license plates.

4. The real-time license plate detection and recognition method based on color augmentation according to claim 1, wherein, the step 2 is specifically as follows: obtaining a position of the horizontal frame and four corner points of the license plate through the license plate detection model, cutting the license plate from the original image according to the position of the horizontal frame, and then using Affine Transformation to transform the view according to the position of the four corner points of the license plate, and outputting the frontal view images of the license plates; the license plate detection model adopts a deep convolutional neural network YOLOv5s architecture.

5. The real-time license plate detection and recognition method based on color augmentation according to claim 4, wherein, the Affine Transformation refers to a process of performing a linear transformation in vector space, which is, multiplying a matrix, and a translation, which is adding a vector, and then transforming to another vector space.

6. A real-time license plate detection and recognition device based on color augmentation, comprising one or more processors, for implementing the real-time license plate detection and recognition method based on color augmentation of claim 1.

7. A non-transitory computer readable storage medium on which a program is stored, the program is executed by a processor for implementing the real-time license plate detection and recognition based on color augmentation of claim 6.

* * * * *